(12) United States Patent
Murakami

(10) Patent No.: US 8,154,773 B2
(45) Date of Patent: Apr. 10, 2012

(54) IMAGE COMMUNICATION APPARATUS AND IMAGE COMMUNICATION CONTROL METHOD

(75) Inventor: Naoya Murakami, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/496,840

(22) Filed: Jul. 2, 2009

(65) Prior Publication Data
US 2009/0303538 A1 Dec. 10, 2009

Related U.S. Application Data

(62) Division of application No. 11/225,195, filed on Sep. 14, 2005, now Pat. No. 7,570,396.

(51) Int. Cl.
*H04N 1/00* (2006.01)
*G06F 3/12* (2006.01)
*G06F 3/048* (2006.01)

(52) U.S. Cl. ... 358/407; 358/402; 358/406; 358/426.02; 358/426.08; 358/426.11; 358/437; 358/442; 358/468; 358/474; 358/476; 358/1.15; 715/824

(58) Field of Classification Search .......................... None
See application file for complete search history.

(56) References Cited

U.S. PATENT DOCUMENTS

| | | | | |
|---|---|---|---|---|
| 5,170,266 A | * | 12/1992 | Marsh et al. | 358/468 |
| 5,760,776 A | * | 6/1998 | McGurrin et al. | 715/841 |
| 6,606,465 B2 | * | 8/2003 | Mutoh et al. | 399/81 |
| 7,019,853 B1 | * | 3/2006 | Maeda | 358/1.15 |
| 7,299,293 B2 | * | 11/2007 | Yoshimura et al. | 709/232 |
| 7,353,463 B2 | * | 4/2008 | Stohrer et al. | 715/827 |
| 2002/0051223 A1 | * | 5/2002 | Izumi et al. | 358/402 |
| 2002/0167690 A1 | | 11/2002 | Fujii et al. | |
| 2003/0137699 A1 | | 7/2003 | Narazaki et al. | |
| 2004/0268267 A1 | * | 12/2004 | Moravcsik | 715/821 |
| 2005/0099655 A1 | * | 5/2005 | Tonegawa | 358/1.15 |
| 2005/0125744 A1 | * | 6/2005 | Hubbard et al. | 715/824 |
| 2006/0017965 A1 | * | 1/2006 | Tonegawa | 358/1.15 |
| 2006/0232800 A1 | * | 10/2006 | Otake | 358/1.9 |
| 2007/0177194 A1 | * | 8/2007 | Yamaguchi | 358/1.15 |

FOREIGN PATENT DOCUMENTS

| | | |
|---|---|---|
| JP | 11-331474 A | 11/1999 |
| JP | 2000-209370 A | 7/2000 |
| JP | 2001-285603 A | 10/2001 |
| JP | 2002-044363 A | 2/2002 |
| JP | 2002-335386 A | 11/2002 |
| JP | 2003-204425 A | 7/2003 |
| JP | 2003-274104 A | 9/2003 |
| JP | 2004-048254 A | 2/2004 |
| JP | 2005-204004 A | 7/2005 |

* cited by examiner

*Primary Examiner* — Twyler Haskins
*Assistant Examiner* — Barbara Reinier
(74) *Attorney, Agent, or Firm* — Foley & Lardner LLP

(57) ABSTRACT

According to one aspect of the present invention, there is provided an image communication apparatus comprising a first FAX communication unit configured to make communications with a partner apparatus according to a first FAX communication function using a public telephone network, a second FAX communication unit configured to make communications with a partner apparatus according to a second FAX communication function using an IP network, an accepter unit configured to accept an operation designation of the first and second FAX communication functions, and a limiter unit configured to limit the first and second FAX communication functions based on the operation designation accepted by the accepter unit.

13 Claims, 5 Drawing Sheets

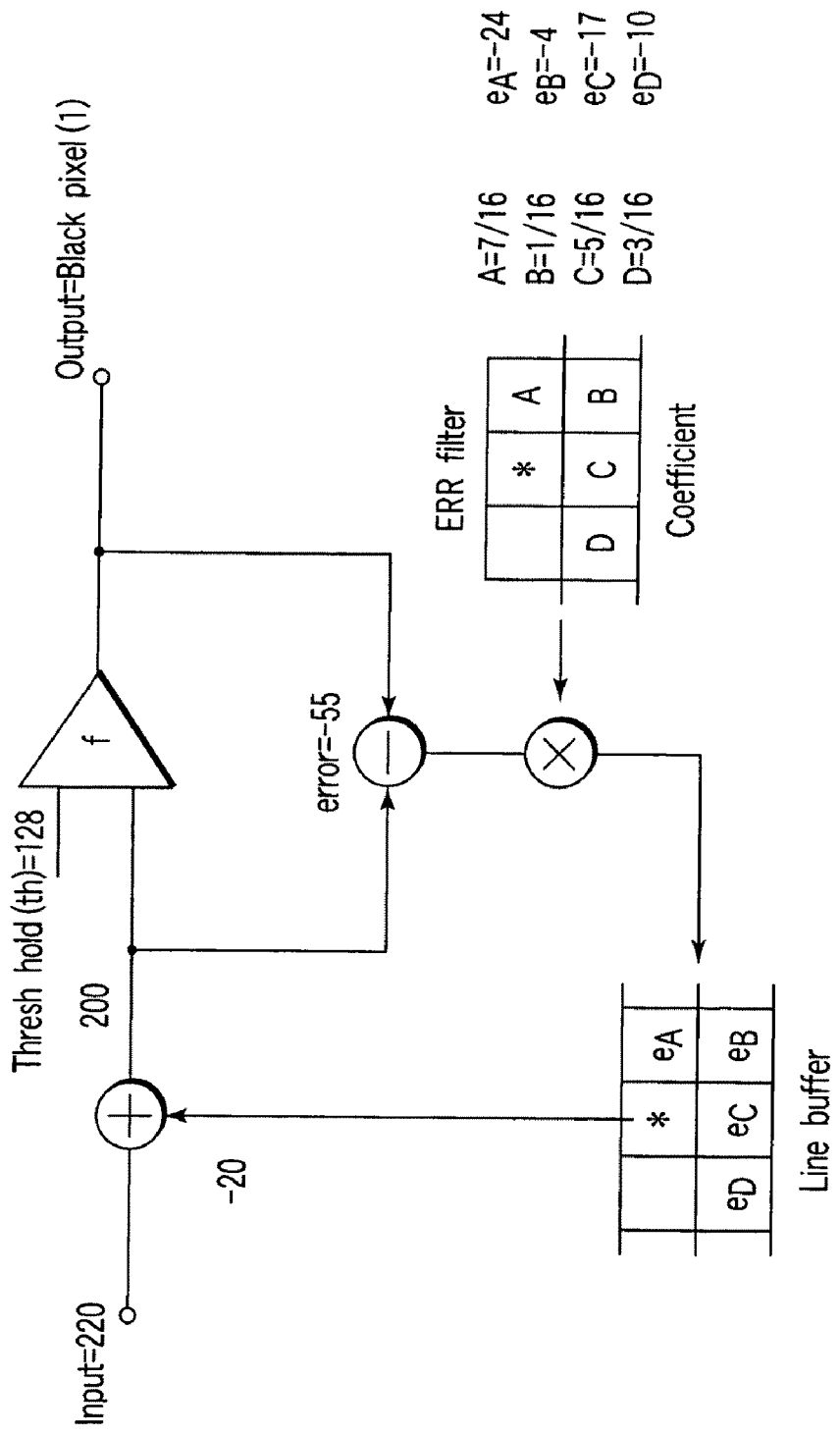
F I G. 2

IMAGE COMMUNICATION APPARATUS AND IMAGE COMMUNICATION CONTROL METHOD

CROSS-REFERENCE TO RELATED APPLICATIONS

The present application is a Divisional of U.S. Ser. No. 11/225,195 filed Sep. 14, 2005, the entire contents of which is incorporated herein by reference.

BACKGROUND OF THE INVENTION

1. Field of the Invention

The present invention relates to an image communication apparatus such as FAX. Moreover, the present invention relates to an image communication control method adaptable to a FAX.

2. Description of the Related Art

In recent years, a printer has come into wide use, and various printers have come onto the market. Moreover, low price and high-speed operation of the printer are achieved. As a result, a printer (MFP: multi-function printer) having various functions has come into wide use in addition to a printer having a print function only.

Typically, an inkjet print is given as a low-price printer. In general, the inkjet printer makes much of color reproduction using color ink. Of the foregoing MFP, a high-grade machine utilizes an electro-photographic print system in general.

There is known a FAX machine (hereinafter, referred to as FAX) as an image transmitter/receiver using the foregoing printer function. The FAX is disclosed in JPN. PAT. APPLN. KOKAI Publication No. 2003-274104, for example. By way of the FAX, G3 FAX using an analog line network and G4 FAX using a digital line network such as ISDN are given. Recently, the Internet has come into wide use; as a result, an IP network is applied to the FAX. The FAX (FAX system) using the IP network is called as an Internet FAX (i-FAX). The method of transmitting and receiving image data using an electronic mail is standardized based on IETF (Internet Engineering Task Force) and ITU-T (International Telecommunication Union-Telecommunication standardization sector).

The format of image data transmitted via the i-FAX is limited to a TIFF (Tag Image File Format) file of profile S (simple-rate mode: RFC 2305). Specifically, the image data format is based on the regulations given below.

Image data: binary image encoded via MH method
Resolution: 100 dpi or 200 dpi
Image width: 1728 pixels (equivalent to A4 size)

On the other hand, the G3 FAX smoothly makes communications in a manner that a transmitter receives a message having process-able image data format from a receiver to transmit the image data in a proper format.

The receiver process-able image data format depends on the specifications of an image forming apparatus appended to the receiver. Likewise, this matter is given in the foregoing i-FAX. Thus, a full-rate mode (transmission) is added to the communication procedure of the i-FAX (TTC standard JT-T37: storage and conversion Internet FAX data transmission procedure).

According to the full-rate mode, it is possible to confirm communication status and transmission result using MDN (Message Disposition Notification, RFC 2298) and DSN (Delivery Status Notification, RFC 1894). Specifically, the transmitter side FAX is able to confirm the following information:

(i) whether image data arrives at the transmitter mail server;
(ii) whether image data arrives at the receiver mail server; and
(iii) whether the receiver-side FAX opens and prints an electronic mail attached with the image data.

Moreover, the receiver-side FAX informs the transmitter-side FAX of the capacity (process-able image data format) using reply message disposition notification. By doing so, the transmitter-side FAX can transmit image data having proper data format. In addition, according to the full-rate mode, several image data having different data format is attached to one electronic mail.

Recently, an MFP supporting an i-FAX function in addition to the foregoing ordinary (public) FAX function has been proposed. The MFP can designate several destinations (addresses) to transmit an image to these destinations all together, using the i-FAX function. Moreover, the MFP can simultaneously designate ordinary FAX destination and i-FAX destination to transmit an image to these destinations all together, using both ordinary FAX function and i-FAX function. The function of transmitting the image to these destinations all together calls a broadcast (multi-destination) transmission function.

The G3 FAX makes communications in a manner that a transmitter reads image data and transmits it after receiving notification having process-able data format from a receiver. By doing so, image transmission is possible without reducing image quality.

In a simple mode (200 dpi)-enabled i-FAX, the transmitter side has no means for specifying the resolution of the receiver side. For this reason, the transmitter side transmits a limited image, that is, TIFF image of profile S.

However, according to the broadcast transmission using both ordinary FAX function and i-FAX function, there is the case of transmitting image data having a resolution exceeding the maximum resolution supportable by the receiver. This results from the following reason. Specifically, the receivable maximum resolution is different among broadcast transmission destinations (several transmission destinations supporting ordinary FAX function and i-FAX function).

For example, user designates the maximum resolution, that is, Super fine mode (15.4 mm×16≈400 dpi), ordinary FAX destination and i-FAX destination. In this case, image is scanned using the maximum resolution. Thus, image data having the designated maximum resolution is intactly transmitted to the ordinary FAX destination. However, the image data having the designated maximum resolution is not transmitted to the i-FAX destination, which does not support the maximum resolution. For this reason, the image data having the maximum resolution image is converted into image data having low resolution via image processing using software (simple thinning). By doing so, the image data having low resolution is not transmitted to the i-FAX destination.

However, image quality degradation occurs due to the foregoing simple resolution conversion. This is a phenomenon, which happens resulting from the following reason. Because, resolution conversion such as thinning is made with respect to binary image data after binarized by error diffusion processing. For this reason, image density reproduction is lost.

BRIEF SUMMARY OF THE INVENTION

An object of the present invention is to provide an image communication apparatus, which can prevent transmission of degradation image, and to provide an image communication control method.

In an aspect of the present invention, there is provided an image communication apparatus comprises a first FAX communication unit configured to make communications with a partner apparatus according to a first FAX communication function using a public telephone network, a second FAX communication unit configured to make communications with a partner apparatus according to a second FAX communication function using an IP network, an accepter unit configured to accept an operation designation of the first and second FAX communication functions, and a limiter unit configured to limit the first and second FAX communication functions based on the operation designation accepted by the accepter unit.

In another aspect of the present invention, there is provided an image communication control method comprises accepting each operation designation of a first FAX communication function using a public telephone network and a second FAX communication function using an IP network, and limiting the first and second FAX communication functions based on the accepted operation designation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a view to explain error diffusion algorithm;

DETAILED DESCRIPTION OF THE INVENTION

Embodiments of the present invention will be described below with reference to the accompanying drawings.

Figure 1:
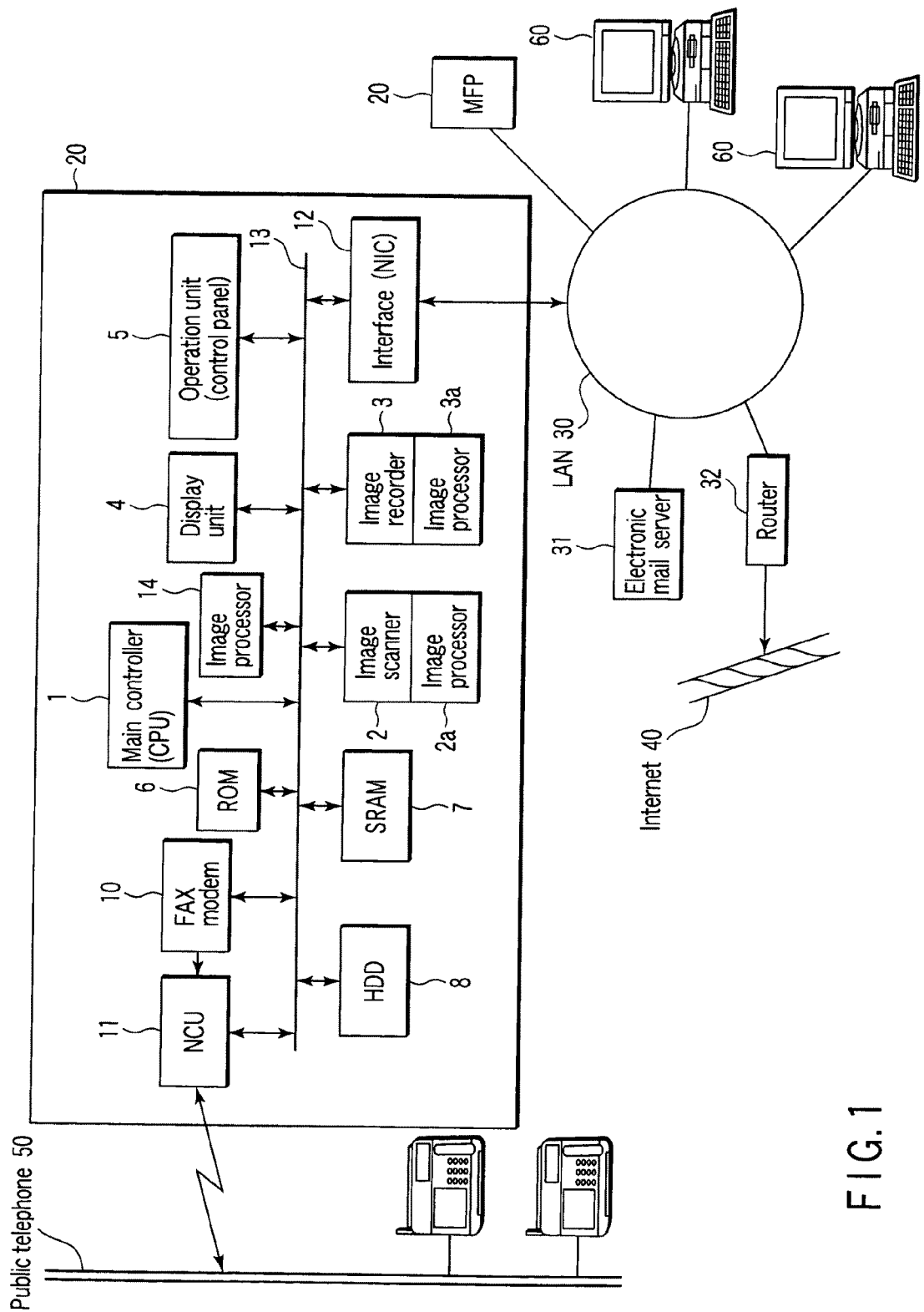
FIG. 1 is a view to explain the schematic configuration of an image forming apparatus (image communication apparatus) according to one embodiment of the present invention.

An image forming apparatus 20 shown in FIG. 1 has ordinary (public) FAX function (G3 FAX or G4 FAX) and i-FAX function. In order to realize the foregoing functions, the image forming apparatus 20 includes main controller 1, image scanner (reader) 2, image recorder 3, display unit 4, and operation unit (control panel) 5. The image forming apparatus 20 further includes ROM 6, SRAM 7, HDD 8 FAX modem 10, NCU 11, interface (Network Interface Card) 12, bus 13 and image processor 14.

The main controller 1 comprises a CPU, and is connected with various devices via the bus 13 to control these devices. The image scanner 2 includes a CCD, and scans a document image using the CCD. The image scanner 2 further includes an image processor 2a, which executes image processing such as density conversion, resolution conversion and binarization to output a binary or multi-level image data. The image recorder 3 is an electro-photographic printer. The image recorder 3 further includes an image processor 3a. The image processor 3a executes necessary image processing with respect to image data transmitted from external devices (ordinary FAX or i-FAX) to print out an image based on the image-processed image data.

The display unit 4 is a display device such as liquid crystal display (LCD) or CRT display. The display unit 4 displays the operation state of the image forming apparatus 20, image data of a document to be transmitted and received image data. The operation unit (control panel) 5 accepts instruction input (operation designation) to operate the image forming apparatus 20. The operation unit 5 includes character key, dial numeric keypad, abbreviated dial key, speed-dial key and various function keys. Incidentally, the display unit 4 may be made into a touch panel (display and input unit). The display unit (touch panel) 4 may accept instruction input accepted by the operation unit 5.

The operation unit 5 accepts instruction input relevant to ordinary FAX function and i-FAX function. For example, the operation unit 5 accepts the following designations. One is ordinary FAX function single designation (ordinary FAX destination (address) designation). Another is i-FAX function single designation (i-FAX destination (address) designation). Another is both ordinary FAX and i-FAX function designations (ordinary FAX and i-FAX destination (address) designation). The operation unit 5 further accepts the following modes. One is a first mode of scanning an image at a first resolution (e.g., 400 dpi) to transmit image data having the first resolution. Another is a second mode of scanning an image at a second resolution (e.g., 200 dpi or 100 dpi) to transmit image data having the second resolution.

The instruction input accepted by the operation unit 5 is supplied to the main controller 1. Then, the main controller 1 controls various operations of the image forming apparatus 20 according to the supplied instruction input. Moreover, the main controller analyzes the content of the instruction input accepted by the operation unit 5 not to accept the content of inhibited instruction input or not to display it.

The ROM 6 previously stores various software programs, which are necessary for the operation of the image forming apparatus 20, and executed by the main controller 1. For example, the ROM 6 stores transmission/reception processing programs of ordinary FAX and i-FAX. The SRAM 7 is used as a main memory of the main controller, and records temporary data generated when a program is executed. The HDD 8 performs a memory function as a so-called image memory, program recording medium and table recording medium. For example, the HDD 8 records inch/millimeter scale in image processor 14 and image recorder 3, resolution, document size in the image recorder 3, coding method in the image processor 14, multi-level/binary, etc.

The FAX modem 10 is connected to a public telephone network via a public telephone line. In other words, the FAX modem 10 has a public FAX modem function for ordinary FAX. The NCU (Network Control Unit) 11 is a hardware circuit, which controls the operation of closing and releasing direct-current loop of an analog public telephone line, and has an auto-dialing function. The NCU 11 connects the public FAX modem 10 to a public telephone circuit as the need arises. The foregoing FAX modem 10 and NCU 11 support an ordinary FAX function (G3 or G4 FAX). The ordinary FAX function of the image forming apparatus supports the following two modes. One is a first mode of scanning an image at a first resolution (e.g., 400 dpi) to transmit image data having the first resolution. Another is a second mode of scanning an image at a second resolution (e.g., 200 dpi or 100 dpi) lower than the first resolution to transmit image data having the second resolution.

The interface 12 is an interface circuit, which converts signal, data and protocol to connect the image forming apparatus 20 to a LAN 30 such as Ethernet (trademark). The interface 12 supports an i-FAX function. The i-FAX function of the image forming apparatus 20 supports a mode of scanning an image at a second resolution (e.g., 200 dpi or 100 dpi) to transmit image data having the second resolution.

The LAN 30 is connected with electronic mail server 31, router 32 and client personal computers 60. The router 32 is connected to a partner mail server (not shown) via Internet (IP network) 40. If the image forming apparatus 20 transmits an electronic mail attached with image data to a transmission partner (i-FAX), the electronic mail is temporarily transmitted to the electronic mail server 31 via interface 12 and LAN 30. Thereafter, the electronic mail server 31 transmits the electronic mail to the transmission partner (i-FAX) via LAN 30, router 32, Internet 40 and partner mail server (not shown). Moreover, the image forming apparatus 20 is able to receive an electronic mail via a path reverse to above. In this case, the method of receiving the electronic mail from the mail server 31 is not limited to POP3, and SMTP may be used. Incidentally, circuit-switching connection to the Internet 40 is not limited to a private (leased) line, dial-up connection using a public line 50 may be used.

The data format of image data transmitted from the i-FAX supported by the image forming apparatus 20 is limited to a TIFF (Tag Image File Format) file of profile S (simple mode: RFC 2305). Specifically, the data format of the image data transmitted from the i-FAX is based on the regulations given below.

Image data: binary image encoded via MH method
Resolution: 100 dpi or 200 dpi
Image width: 1728 pixels (equivalent to A4 size)

When the ordinary FAX function supported by the image forming apparatus 20 is executed, dot image data scanned by the image scanner 2 is determined based on public FAX regulations. Conversely, the image forming apparatus 20 decodes encoded data received from a partner apparatus (FAX 62) into image data using software, and outputs it as a hard copy via the image recorder 3.

The operation unit 5 of the image forming apparatus 20 accepts i-FAX or ordinary FAX destination designation. Moreover, when a certain document is transmitted, the operation unit 5 can simultaneously designate both i-FAX and ordinary FAX destinations. In this case, the image quality (resolution) of the transmitted document is singly designated.

For example, user designates broadcast transmission of designating the maximum resolution, that is, Super Fine mode (15.4 mm×16≈400 dpi) and simultaneously designating both i-FAX and ordinary FAX destinations. In this case, an image is scanned one-time only. In other words, the image is scanned at the designated maximum resolution, and the image having the maximum resolution is intactly transmitted via the ordinary FAX function. On the other hand, the resolution of the image having the maximum resolution is converted (reduced), and thereafter, the image having the converted resolution is transmitted via the i-FAX function.

Figure 3:
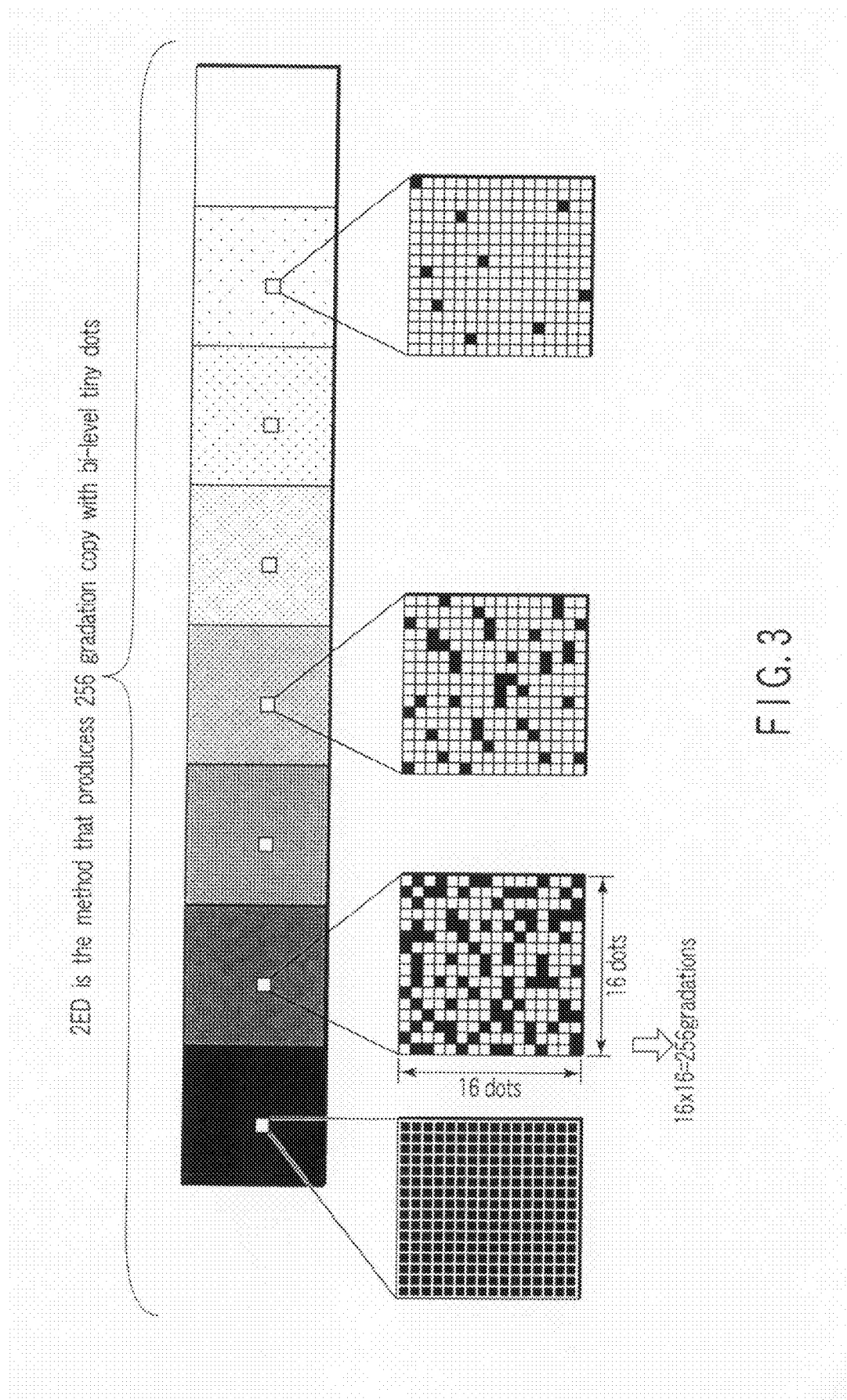
FIG. 3 is a view showing binary error diffusion.
Figure 4:
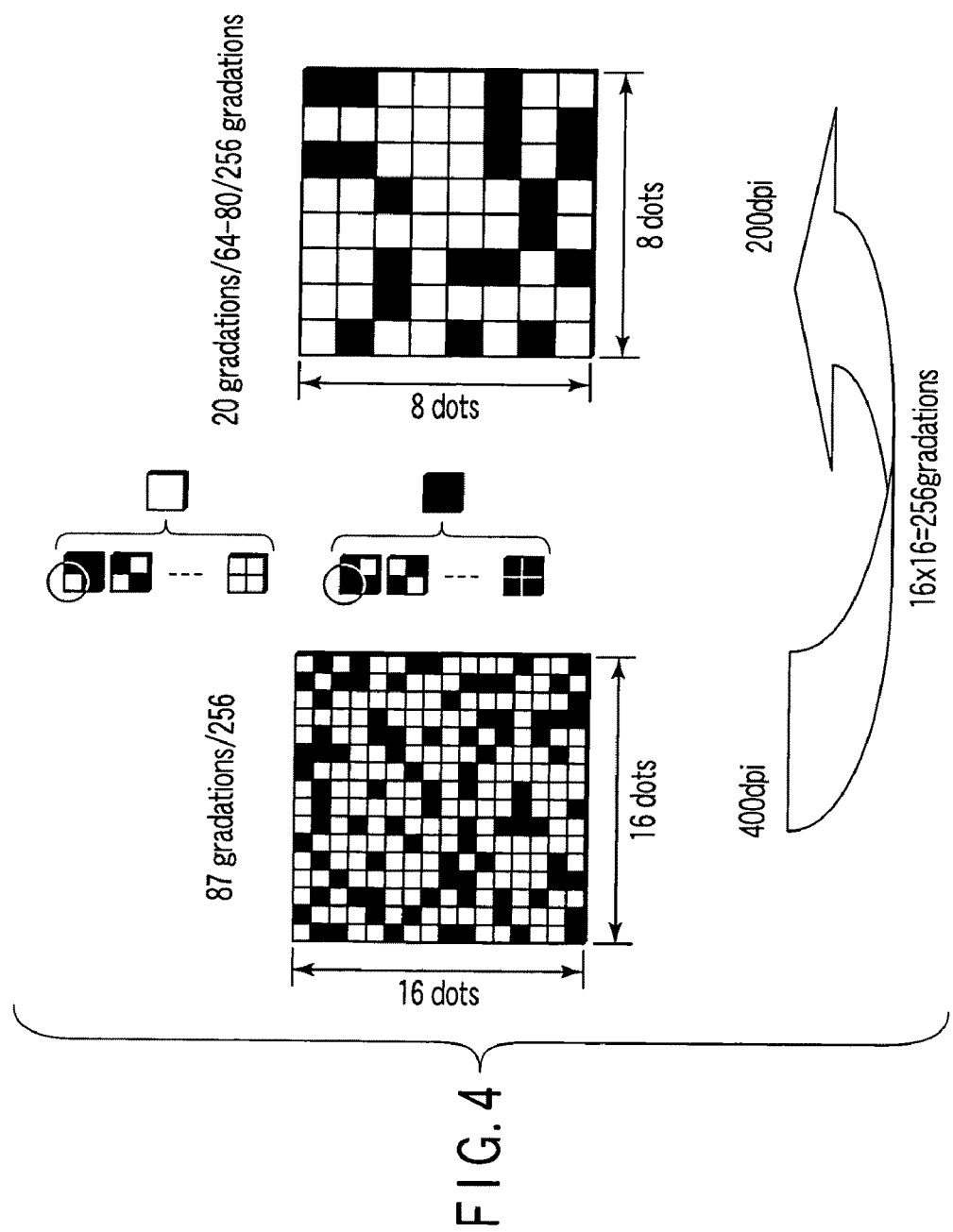
FIG. 4 is a view to explain resolution conversion in binary error diffusion.

It is impossible to transmit a high-resolution image (400 dpi) to a partner apparatus, which supports a simple mode (200 dpi) only in FAX communication protocol. Thus, if high-resolution image (400 dpi) transmission is designated, the following image processing must be carried out. Specifically, the high-resolution image is subjected to image processing (simple reduction) using software so that it is converted into a low-resolution image (200 dpi), and then, the low-resolution image is transmitted. However, image density reproduction is lost due to the foregoing image processing (simple reduction) using software. As a result, the image quality is degraded (roughness occurs, or gradation is worsened). The problem of the image quality degradation remarkably appears in the case where resolution conversion by binary error diffusion shown in FIG. 4 using error diffusion algorithm shown in FIG. 2 and FIG. 3 is made. Specifically, if binary error diffusion is simply converted in resolution based on sampling, image density is not reproduced; as a result, image degradation such as roughness occurs.

The image forming apparatus solves the foregoing problem in the following manner.

(1) If i-FAX destination is designated, image scanning is inhibited (limited) at high resolution (e.g., 400 dpi higher than 200 dpi). Moreover, if both i-FAX and ordinary FAX destinations are designated (broadcast transmission), image scanning is inhibited (limited) at high resolution (e.g., 400 dpi higher than 200 dpi).

Figure 5:
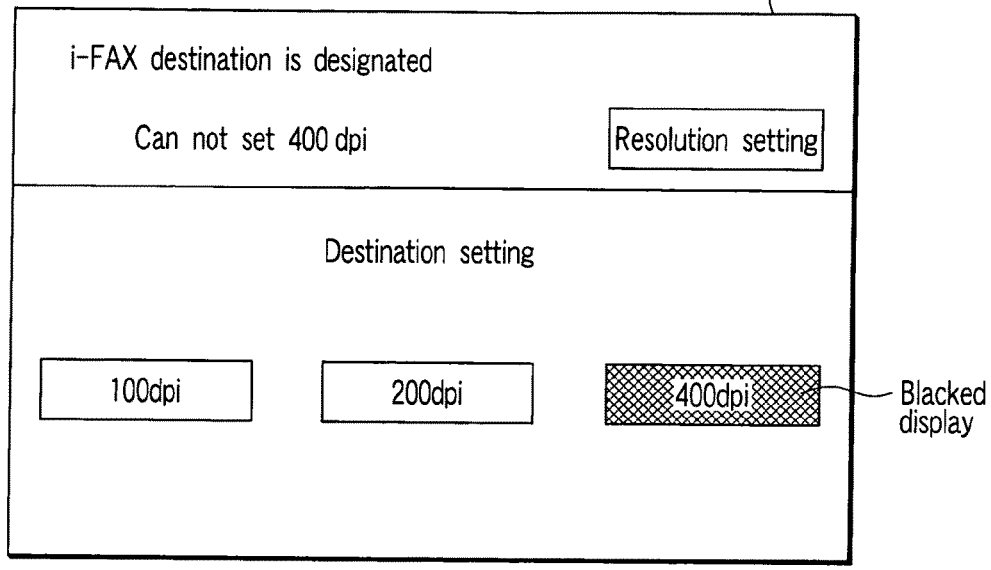
FIG. 5 is a view showing a control screen for inhibiting image reading at high resolution (400 dpi) when i-FAX destination is designated.

The main controller 1 detects i-FAX destination designation accepted via the operation unit 5, and then, inhibits image scanning at high resolution. Moreover, the main controller 1 detects i-FAX and ordinary FAX destination designations accepted via the operation unit 5 (detects broadcast transmission), and then, inhibits image scanning at high resolution. The operation unit 5 does not accept image scanning at high resolution based on the instruction to inhibit image scanning at high resolution from the main controller 1. As shown in FIG. 5, the operation unit 5 makes invalid display (darkened display) with respect to a high-resolution scan designation button. Specifically, the high-resolution scan designation button is displayed darker than the display of other buttons functioning validly. Moreover, if it is deeply desired to designate high resolution, it is possible to simply reset the destination using a destination setting button (to simply delete i-FAX destination). By doing so, high-resolution setting is possible.

(2) If an image is scanned at high resolution (e.g., 400 dpi higher than 200 dpi), i-FAX destination designation is inhibited (limited). In other words, if an image is scanned at high resolution, ordinary FAX destination designation is allowable; however, i-FAX destination designation is inhibited (broadcast transmission is inhibited).

Figure 6:
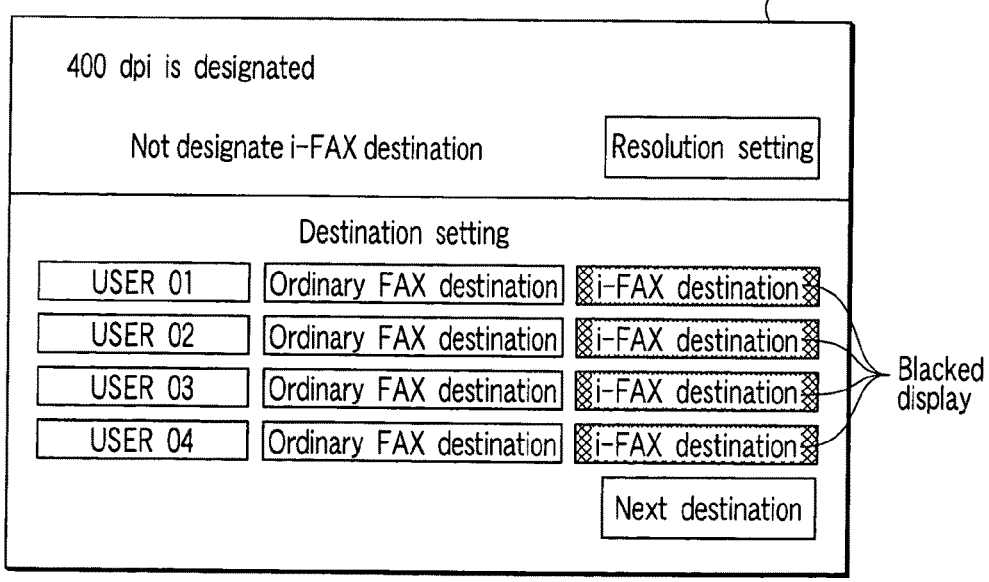
FIG. 6 is a view showing a control screen for inhibiting destination of i-FAX destination when high resolution (400 dpi) is designated.

The main controller 1 detects image scan designation at high resolution accepted via the operation unit 5, and then, inhibits i-FAX destination designation. The operation unit 5 does not accept i-FAX destination designation based on the instruction to inhibit i-FAX destination designation from the main controller 1. Moreover, the operation unit 5 makes invalid display (darkened display) with respect to an i-FAX destination designation button, as shown in FIG. 6. Specifically, the i-FAX destination designation button is displayed darker than the display of other buttons functioning validly. Moreover, if it is deeply desired to designate i-FAX destination, it is possible to simply reset the resolution using a resolution setting button (to simply set low resolution). By doing so, i-FAX destination setting is possible.

(3) The resolution of a transmitted image is limited less than the maximum resolution supported by a receiver machine. Specifically, if the resolution of the scanned image exceeds the maximum resolution supported by the receiver machine, the scanned image is transmitted after the resolution is reduced. If the resolution of the gradated image is reduced, the foregoing problem of degrading the image quality arises.

For example, an image is scanned at high resolution (e.g., 400 dpi) to generate multi-level image data having high resolution, and thereafter, saved in the HDD 8. In this case, the multi-level image data may be compressed, and thereafter, saved in the HDD 8. If the maximum resolution supported by the receiver machine (i-FAX) is low resolution (e.g., 200 dpi), image processing by the image processor 14 is carried out. According to the image processing, the multi-level image data having high resolution (image data before gradating) is converted into binary image data having low resolution, and thereafter, the binary image data having low resolution is transmitted. Specifically, the multi-level image data having high resolution saved in the HDD 8 is converted into multi-level image data having low resolution. Further, the multi-level image data having low resolution is converted into binary image data having low resolution (resolution conversion, filtering, density conversion, binary error diffusion). Then, the binary image data having low resolution is transmitted using the i-FAX function. By doing so, it is possible to prevent the image quality from degrading. On the other hand, if the maximum resolution supported by the receiver machine (i-FAX) is high resolution (e.g., 400 dpi), image processing by the image processor 14 is carried out. According to the image processing, the multi-level image data having high resolution (image data before gradating) is converted into binary image data having high resolution, and thereafter, the binary image data having high resolution is transmitted. Specifically, the multi-level image data having high resolution saved in the HDD 8 is converted into binary image data having high resolution. Further, the binary image data having high resolution is encoded according to encoding methods such as MH, MR and MMR determined by public FAX regulations. Then, image data encoded by the ordinary FAX function is transmitted.

In other words, if 400-dpi ordinary FAX function (ordinary FAX destination) and 200-dpi i-FAX function (i-FAX destination) are simultaneously designated, an image is scanned at resolution of 400 dpi to acquire 400-dpi multi-level image data. Thereafter, in image data transmission according to the ordinary FAX function, the acquired 400-dpi multi-level image data is converted into 400-dpi binary image data, and then, the 400-dpi binary image data is transmitted. In image data transmission according to the i-FAX function, the acquired 400-dpi multi-level image data is converted into 200-dpi multi-level image data. Thereafter, the converted 200-dpi multi-level image data is transmitted. Namely, resolution conversion is not made with respect to multi-level image data, and not binary image data; therefore, image data is transmitted without reducing the image quality.

In order to prevent degradation of gradated image data as much as possible, halftone picture, that is, resolution conversion for saving the image density of binary error diffusion image may be made. In order to save the image density of binary error diffusion image, a binary image is once converted into multi-level image data, and thereafter, resolution conversion is made. Further, the binary image is again binarized (subjected to 2ED processing), and then, data is transmitted. By doing so, it is possible to prevent image degradation.

For example, an image is scanned at high resolution (e.g., 400 dpi) to generate binary image data having high resolution, and thereafter, saved in the HDD 8. If the maximum resolution supported by the receiver machine (i-FAX) is low resolution (e.g., 200 dpi), image processing by the image processor 14 is carried out. According to the image processing, the binary image data having high resolution is converted into multi-level image data having high resolution. Thereafter, the multi-level image data having high resolution is converted into binary image data having high resolution, and then, the binary image data having high resolution is transmitted. Specifically, the binary image data having high resolution saved in the HDD 8 is converted into multi-level image data having high resolution. Further, the multi-level image data having high resolution is converted into multi-level image data having low resolution. Further, the multi-level image data having low resolution is converted into binary image data having low resolution. Then, the binary image data having low resolution is transmitted using the i-FAX function. By doing so, it is possible to prevent the image quality from degrading. On the other hand, if the maximum resolution supported by the receiver machine (i-FAX) is high resolution (e.g., 400 dpi), the following image processing is carried out. According to the image processing, the binary image data having high resolution saved in the HDD 8 is encoded according to encoding methods such as MH, MR and MMR determined by public FAX regulations. Then, image data encoded by the ordinary FAX function is transmitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image communication apparatus, comprising:
    a first communication unit configured to make communication with a partner apparatus according to a first communication function using a public telephone network, the first communication function supporting two modes, that is a first mode of transmitting image data having a first resolution and a second mode having a second resolution lower than the first resolution;
    a second communication unit configured to make communication with a partner apparatus according to a second communication function using an IP network, the second communication function supporting the second mode;
    an acceptor unit configured to accept destination designation; and
    a display unit configured to display an impossible setting of the first resolution in a case that the acceptor unit accepts the destination designation for the first communication function and the second communication function.

2. An image communication apparatus, comprising:
    a first communication unit configured to make communication with a partner apparatus according to a first communication function using a public telephone network, the first communication function supporting two modes, that is a first mode of transmitting image data having a first resolution and a second mode having a second resolution lower than the first resolution;
    a second communication unit configured to make communication with a partner apparatus according to a second communication function using an IP network, the second communication function supporting the second mode;
    an acceptor unit configured to accept destination designation for the first and second communication function; and
    a display unit configured to display an impossible setting of the first resolution in a case that the acceptor unit accepts the destination designation for the first communication function and the second communication function.

3. An image communication apparatus, comprising:
a first communication unit configured to make communication with a partner apparatus according to a first communication function using a public telephone network, the first communication function supporting two modes, that is a first mode of transmitting image data having a first resolution and a second mode having a second resolution lower than the first resolution;
a second communication unit configured to make communication with a partner apparatus according to a second communication function using an IP network, the second communication function supporting the second mode;
an acceptor unit configured to accept destination designation for the first or the second mode; and
a display unit configured to display an impossible setting of the destination designation for the second communication function in a case that the image data is scanned at the first resolution.

4. An image communication apparatus, comprising:
a first communication unit configured to make communication with a partner apparatus according to a first communication function using a public telephone network, the first communication function supporting two modes, that is a first mode of scanning an image at first resolution and transmitting image data having the first resolution, and a second mode of scanning an image at second resolution lower than the first resolution and transmitting image data having the second resolution;
a second communication unit configured to make communication with a partner apparatus according to a second communication function using an IP network, the second communication function supporting the second mode;
an acceptor unit configured to accept destination designation; and
a display unit configured to display an impossible setting of the first resolution in a case that the acceptor unit accepts the destination designation for the second communication function.

5. An image communication method for an image communication apparatus comprising (i) a first communication unit configured to make communication with a partner apparatus according to a first communication function using a public telephone network, the first communication function supporting two modes, that is a first mode of transmitting image data having a first resolution and a second mode having a second resolution lower than the first resolution, and (ii) a second communication unit configured to make communication with a partner apparatus according to a second communication function using an IP network, the second communication function supporting the second mode, the method comprising:
accepting destination designation; and
displaying an impossible setting of the first resolution in a case that the destination designation for the first communication function and the second communication function is accepted.

6. An image communication method for an image communication apparatus comprising (i) a first communication unit configured to make communication with a partner apparatus according to a first communication function using a public telephone network, the first communication function supporting two modes, that is a first mode of transmitting image data having a first resolution and a second mode having a second resolution lower than the first resolution, and (ii) a second communication unit configured to make communication with a partner apparatus according to a second communication function using an IP network, the second communication function supporting the second mode, the method comprising:
accepting destination designation for the first communication function and second communication function; and
displaying an impossible setting of the first resolution in a case that the destination designation for the first communication function and the second communication function is accepted.

7. An image communication method for an image communication apparatus comprising (i) a first communication unit configured to make communication with a partner apparatus according to a first communication function using a public telephone network, the first communication function supporting two modes, that is a first mode of transmitting image data having a first resolution and a second mode having a second resolution lower than the first resolution, and (ii) a second communication unit configured to make communication with a partner apparatus according to a second communication function using an IP network, the second communication function supporting the second mode, the method comprising:
accepting destination designation for the first communication function and second communication function; and
displaying an impossible setting of the destination designation for the second communication function in a case that the image data is scanned at the first resolution.

8. An image communication method for an image communication apparatus comprising (i) a first communication unit configured to make communication with a partner apparatus according to a first communication function using a public telephone network, the first communication function supporting two modes, that is a first mode of scanning an image at first resolution and transmitting image data having the first resolution, and a second mode of scanning an image at second resolution lower than the first resolution and transmitting image data having the second resolution, and (ii) a second communication unit configured to make communication with a partner apparatus according to a second communication function using an IP network, the second communication function supporting the second mode, the method comprising:
accepting destination designation; and
displaying an impossible image scanning at the first resolution in a case that the destination designation for the second communication function is accepted.

9. The image communication apparatus according to claim 4, wherein the display unit displays an impossible setting of the destination designation for the second communication function when the image data is scanned at the first resolution.

10. The image communication apparatus according to claim 1, wherein the display unit displays an impossible setting of the first resolution by darkening a display region of the display unit with respect to a first resolution scan designation button.

11. The image communication apparatus according to claim 2, wherein the display unit displays an impossible setting of the first resolution by darkening a display region of the display unit with respect to a first resolution scan designation button.

12. The image communication apparatus according to claim 3, wherein the display unit displays an impossible setting of the first resolution by darkening a display region of the display unit with respect to a first resolution scan designation button.

13. The image communication apparatus according to claim 4, wherein the display unit displays an impossible setting of the first resolution by darkening a display region of the display unit with respect to a first resolution scan designation button.

* * * * *